(12) United States Patent
Helmich et al.

(10) Patent No.: US 10,019,297 B2
(45) Date of Patent: Jul. 10, 2018

(54) SYSTEMS AND METHODS FOR IMPLEMENTING BULK HANDLING IN ASYNCHRONOUS PROCESSING

(71) Applicant: salesforce.com, inc., San Francisco, CA (US)

(72) Inventors: Marco Helmich, San Francisco, CA (US); Ananya Yadav, San Francisco, CA (US); Praveen Murugesan, Foster City, CA (US); Vijayanth Devadhar, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 813 days.

(21) Appl. No.: 14/306,113

(22) Filed: Jun. 16, 2014

(65) Prior Publication Data
US 2014/0304246 A1    Oct. 9, 2014

Related U.S. Application Data

(63) Continuation-in-part of application No. 14/244,887, filed on Apr. 3, 2014, now abandoned.
(Continued)

(51) Int. Cl.
*G06F 7/00* (2006.01)
*G06F 17/30* (2006.01)
(Continued)

(52) U.S. Cl.
CPC ........ *G06F 9/546* (2013.01); *G06F 17/30477* (2013.01); *H04L 67/26* (2013.01); *G06F 2209/548* (2013.01)

(58) Field of Classification Search
CPC ........................... G06F 17/30477; H04L 67/26
See application file for complete search history.

(56) References Cited

U.S. PATENT DOCUMENTS 5,577,188 A    11/1996  Zhu
5,608,872 A     3/1997  Schwartz et al.
(Continued)

OTHER PUBLICATIONS

"Batch/Bulk receive messages using java client?" downloaded from http://qpid.2158936.n2.nabble.com/Batch-Bulk-receive-messages-using-java-client-td7579575.html, dated Jul. 12, 2012, 16 pages.

*Primary Examiner* — Charles Lu
(74) *Attorney, Agent, or Firm* — Elliott, Ostrander & Preston, P.C.

(57) ABSTRACT

Systems and methods for implementing bulk handling in asynchronous processing are described. For example, an exemplary system includes a processor and a memory to execute instructions at the system; a broker to enqueue received messages; a push connection from the broker to a thread, in which the broker is to push an initial message to the thread for processing; a pull connection from the thread to the broker, in which the thread is to request one or more additional messages for bulk processing with the initial message from the broker; a query interface to issue a database query from the thread to a data store, the database query specifying the initial message and the one or more additional messages as a set of messages to obtain a lock for the set of messages; and a message processing engine to handle the set of messages in bulk based on whether the lock for the set of messages is obtained.

25 Claims, 8 Drawing Sheets

Related U.S. Application Data

(60) Provisional application No. 61/807,901, filed on Apr. 3, 2013.

(51) Int. Cl.
*G06F 9/54* (2006.01)
*H04L 29/08* (2006.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0037102 A1* | 2/2003 | Eckert ............ H04L 29/06 709/203 |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0198365 A1* | 9/2005 | Wei ............ G06F 17/2247 709/237 |
| 2007/0203910 A1* | 8/2007 | Ferguson ......... G06F 17/30575 |
| 2009/0177744 A1 | 7/2009 | Marlow et al. |
| 2012/0151489 A1* | 6/2012 | Wu ............ G06F 9/54 718/102 |

* cited by examiner

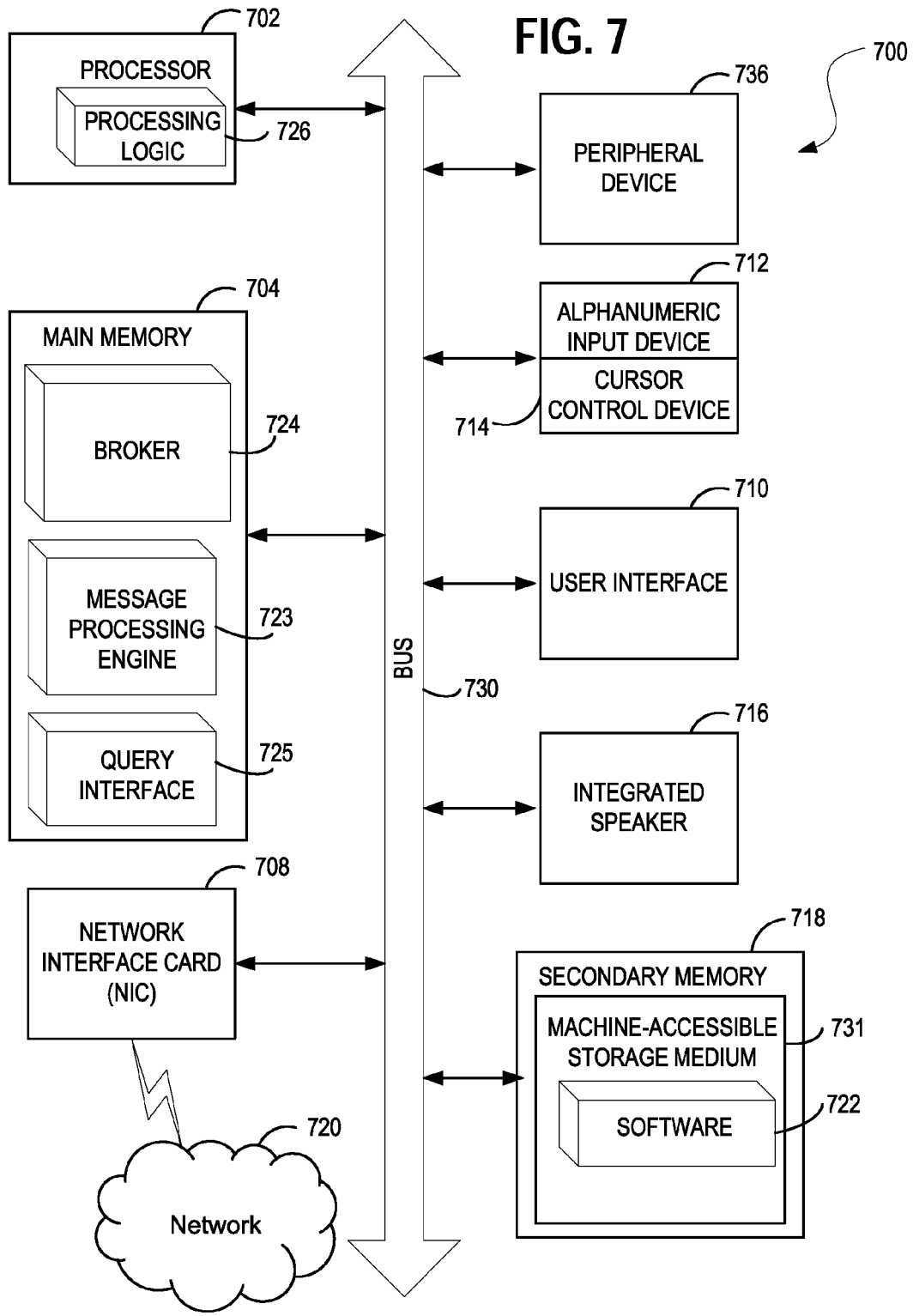

US 10,019,297 B2

SYSTEMS AND METHODS FOR IMPLEMENTING BULK HANDLING IN ASYNCHRONOUS PROCESSING

CLAIM OF PRIORITY

This continuation-in-part application is related to, and claims priority to, the non-provisional utility application entitled "SYSTEMS AND METHODS FOR IMPLEMENTING BULK HANDLING IN ASYNCHRONOUS PROCESSING," filed on Apr. 3, 2014, having an application Ser. No. of 14/244,887; and the provisional utility application entitled "SYSTEM AND METHOD FOR BULK HANDLING IN ASYNCHRONOUS PROCESSING," filed on Apr. 3, 2013, having an application No. of 61/807,901 and, the entire contents of which are incorporated herein by reference as though set forth in full.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems and methods for implementing bulk handling in asynchronous processing. Such means may be implemented within the computing architecture of a hosted computing environment, such as an on-demand or cloud computing environment which utilizes multi-tenant database technologies, client-server technologies, traditional database technologies, or other computing architecture in support of the hosted computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Message queuing and asynchronous processing implementations are capable supporting a significantly higher volume of concurrent messages without requiring special handling for the well known problems of deadlocks and race conditions. Not surprisingly then, asynchronous processing is found in many high-volume processing environments.

A message queue is simply a mechanism by which applications and discrete functional components may send messages between one another in order to reliably communicate. The message queue "broker" facilitates the message passing amongst such components by providing a protocol or interface accessible to the various services and components. For instance, the interface may be tied to a web based interface such that web based applications may communicate with and through the interface to originate messages and have those messages simply and reliably enqueued by the broker within the message queue. The broker will then handle further processing by distributing the message for processing and dequeuing the message at the appropriate time.

Thus, conventional solutions that implement asynchronous processing and message delivery commonly do so via a broker machine that accepts and enqueues incoming messages from a message producer or originator, distributes the queued messages one at a time for processing, and then dequeues the messages as appropriate.

While this model has proven successful in certain environments, it can nevertheless be improved upon. For instance, the conventional model is not fully transactional, lacks sufficient availability for high volume and high availability implementations, and wholly lacks any support whatsoever for bulk distribution, bulk processing, and bulk dequeuing of messages.

The present state of the art may therefore benefit from the systems and methods for implementing bulk handling in asynchronous processing as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 7 illustrates a diagrammatic representation of a machine in the exemplary form of a computer system, in accordance with one embodiment.

DETAILED DESCRIPTION

Figure 1:
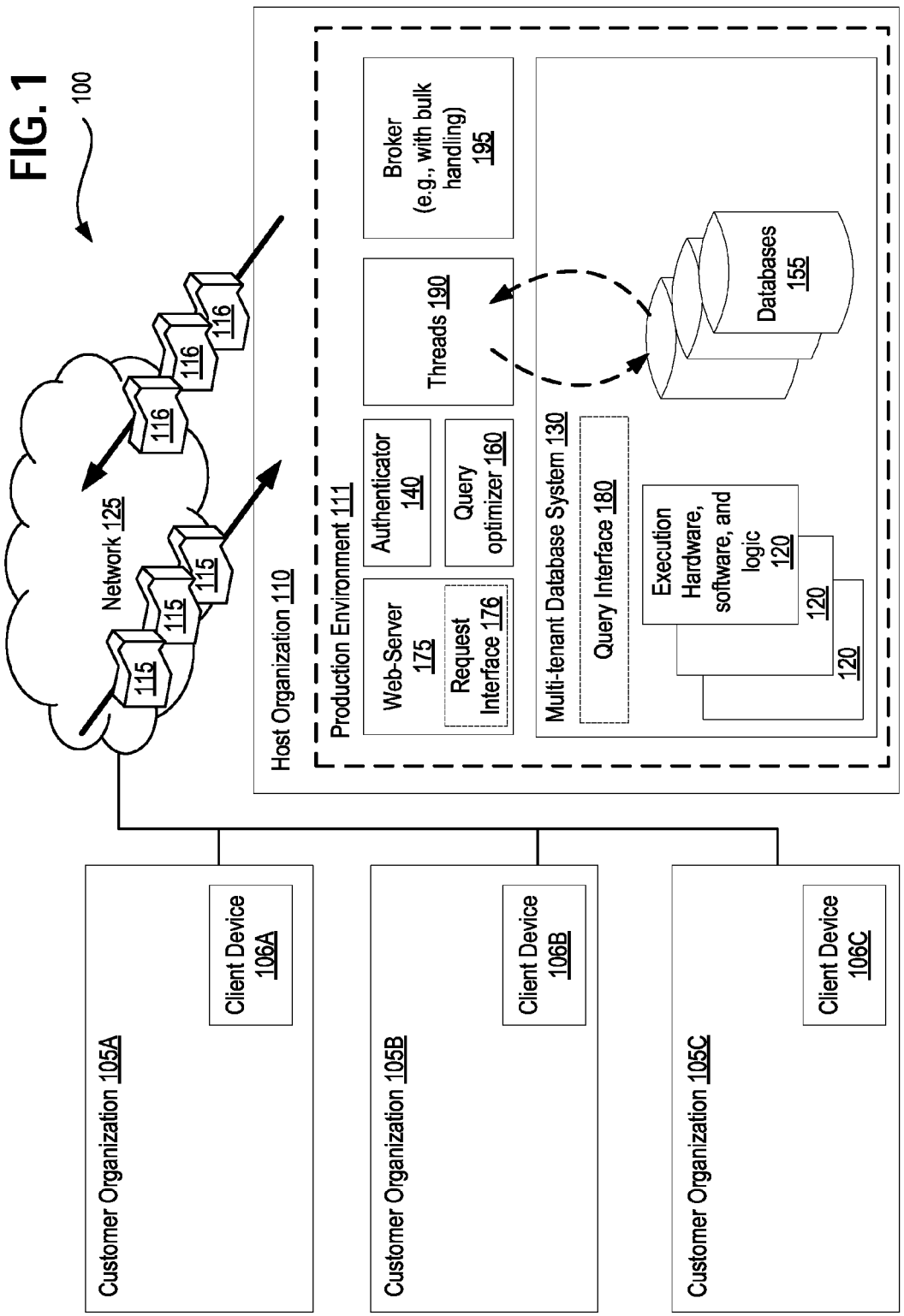
FIG. 1 depicts an exemplary architecture in accordance with described embodiments.

Described herein are systems and methods for implementing bulk handling in asynchronous processing. An exemplary system may include, for example: a processor and a memory to execute instructions at the system; a broker to enqueue received messages; a push connection from the broker to a thread, in which the broker is to push an initial message to the thread for processing; a pull connection from the thread to the broker, in which the thread is to request one or more additional messages for bulk processing with the initial message from the broker; a query interface to issue a database query from the thread to a data store, the database query specifying the initial message and the one or more additional messages as a set of messages to obtain a lock for the set of messages; and a message processing engine to handle the set of messages in bulk based on whether the lock for the set of messages is obtained. In certain embodiments, the messages which are pulled for bulk processing are restricted to or specified as being of the same message type.

While the receipt, enqueuing, dispatch, and dequeuing of individual messages for processing is common, there are certain instances in which the processing of multiple messages individually constitutes greater processing requirements than if they were processed together. Stated differently, in certain instances, the processing required to handle the sum of the parts (e.g., process multiple messages individually) is greater than the processing required to handle the sum of the multiple messages together, concurrently, in bulk.

Leveraging these opportunities to handle multiple messages in bulk will therefore yield improved efficiency and thus better performance and lower cost to the customer organizations, tenants, subscribers, and users for which such computational processing is undertaken.

Unfortunately, conventional asynchronous processing message handlers provide no support whatsoever for such bulk handling.

Releasing previously enqueued messages in bulk additionally requires keeping track of the stage of the set of the messages across two separate and distinct data stores so as to ensure consistency of the messages which is a unique problem not encountered by conventional asynchronous processing systems which release messages one by one as distinct and unique individual messages. Because conventional asynchronous processing systems do not ever release messages in bulk as a group or a set, it logically follows that there is no need for such conventional solutions to track the set or the group of messages released. Further still, conventional asynchronous processing systems do not provide a mechanism by which a set of messages can be provided to the broker as a related group.

Conversely, described herein are means by which a group of messages may be provided to the broker or message handler as a related group and also released as a related group of messages for processing, while maintaining the stage (e.g., the stage of processing, the state, the status, etc.) of the set of messages across the two separate data stores.

Certain embodiments operate within a hosted computing environment, also referred to as a provider of on-demand services, on-demand database services, cloud computing services, or simply a host organization that provides services to subscribing customer organizations. Such host organizations utilize various technologies to service many different tenants (e.g., customer organizations and their users) simultaneously. Such technologies may include, for example, client-server implementations, computing grids, computing pods or pools of work machines, traditional databases, single tenancy database systems and/or multi-tenant database systems. A multi-tenant database system in particular operates to store data on behalf of a multitude of subscribers, each being a "tenant" of the database system, hence the term multi-tenant database system. Many subscribers (e.g., users or tenants) utilize the computing technologies of the host organization to access analytics, charts, views, reports, and other such data which is stored within the servers, systems, databases, and multi-tenant database system of the host organization. For instance, a sales team may utilize sales data stored within such a system.

Bulk processing of messages and bulk dequeuing provides computational efficiencies over conventional methods, potentially drastically reducing processing time to conduct the same amount of work associated with multiple individual messages by eliminating various overheads associated with processing messages individually. For instance, bulk message handlers may elect to process messages in bulk in order to piggyback on acquired locks and other common setup tasks, such as the creation of connections and the termination of such connections, in order to speed up processing. In other instances, messages are configured to dictate that they are configured for bulk processing.

Use of a secondary store to store the messages, copies of the messages, or unique records corresponding to the messages provides certain advantages such as data consistency in which all messages arrive and leave in the same state; atomicity in which database transactions are guaranteed to either completely occur, or have no effects, for instance, by rolling back the transaction; and availability by ensuring the database is not corrupted by erroneous duplicate processing or due to records enqueued for processing but lost or orphaned.

In some embodiments messages are bucketed and processed in chunks, batches, groups, or sets in order to take advantage of reduced setup work such as locking, connections, and other pre and post processing tasks required per transaction whether for an individual message or a large group of messages processed together as a set.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 depicts an exemplary architecture 100 in accordance with described embodiments. In one embodiment, a production environment 111 is communicably interfaced with a plurality of client devices 106A-C (e.g., such as mobile devices, smart phones, tablets, PCs, etc.) through host organization 110. In one embodiment, a multi-tenant database system 130 includes databases 155, for example, to store tables, datasets, and underlying database records with user data on behalf of customer organizations 105A-C (e.g., tenants of the multi-tenant database system 130 or their affiliated users). In alternative embodiments, a client-server computing architecture may be utilized in place of the multi-tenant database system 130, or a computing grid, or a pool of work servers, or some combination of hosted computing architectures to carry out the computational workload and processing demanded of the host organization 110.

The multi-tenant database system 130 depicted in the embodiment shown includes a plurality of underlying hardware, software, and logic elements 120 that implement database functionality and a code execution environment within the host organization 110. In accordance with one embodiment, multi-tenant database system 130 further implements databases 155 to service database queries and other data interactions with the databases 155. The hardware, software, and logic elements 120 of the multi-tenant database system 130 are separate and distinct from a plurality of customer organizations (105A, 105B, and 105C) which utilize the services provided by the host organization 110 by communicably interfacing to the host organization 110 via network 125. In such a way, host organization 110 may implement on-demand services, on-demand database services or cloud computing services to subscribing customer organizations 105A-C.

Host organization 110 receives input and other requests 115 from a plurality of customer organizations 105A-C via network 125 (such as a public Internet). For example, incoming database queries, API requests, interactions with displayed graphical user interfaces and displays at the client devices 106A-C, or other inputs may be received from the customer organizations 105A-C to be processed against the multi-tenant database system 130.

Broker 195 (e.g., with bulk handling) supports the receipt, enqueuing, distribution, and dequeuing of messages in support of asynchronous processing as well as the receipt, enqueuing, distribution, and dequeuing of groups or sets of messages in support of bulk handling in asynchronous processing. The broker 195 further supports the tracking of the stage of a set or group of messages to maintain consistency, high availability, and transactionality. Threads perform work, and in particular, process messages or sets of messages on behalf of the host organization 110 by interfacing and utilizing the resources of the multi-tenant database system 130 or other hosted computing architecture as necessary.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its multi-tenant database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 and provide a web-based interface or other graphical displays to an end-user client device 106A-C or machine originating such data requests 115.

Host organization 110 may implement a request interface 176 via web-server 175 or as a stand-alone interface to receive requests packets or other requests 115 from the client devices 106A-C. Request interface 176 further supports the return of response packets or other replies and responses 116 in an outgoing direction from host organization 110 to the client devices 106A-C.

Authenticator 140 operates on behalf of the host organization to verify, authenticate, and otherwise credential users attempting to gain access to the host organization.

An optional query interface 180 provides functionality to pass queries from web-server 175 into the multi-tenant database system 130 for execution against the databases 155 or other data stores of the host organization's production environment 111. Alternatively, threads 190 may pass such queries directly into the databases 155 or other data stores of the host organization 110 without utilizing the optional query interface 180. In one embodiment, the query interface 180 implements an Application Programming Interface (API) through which queries may be executed against the databases 155 or other data stores including queries arriving from threads 190. Query optimizer 160 performs query translation and optimization, for instance, on behalf of other functionality such as the functionality implemented by the threads 190 or by a graphical interface which possesses sufficient information to architect a query (e.g., identifying parameters, targets, tables, records, rows, actions, etc.) yet lacks the necessary logic to actually construct the appropriate query syntax into the databases 155 of the multi-tenant database system 130. In other instances, query optimizer 160 modifies a submitted query to optimize its execution within the host organization without affecting the resulting dataset returned responsive to such an optimized query.

Figure 2:
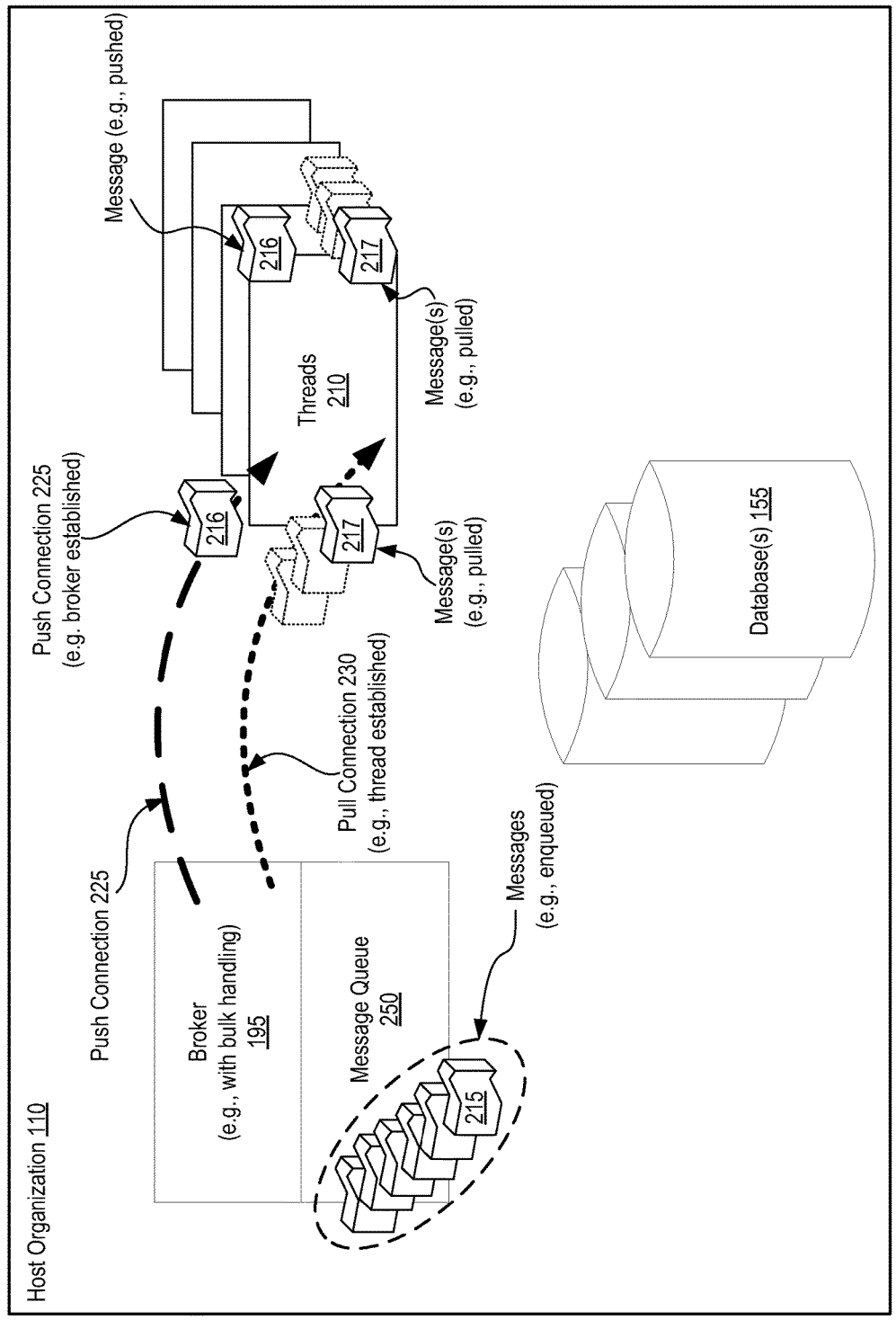
FIG. 2 depicts interactions with the broker from FIG. 1 in additional detail.

FIG. 2 depicts interactions with the broker 195 from FIG. 1 in additional detail. The host organization 110 and its database(s) 155 are again shown here, along with the broker 195, however, additional detail is now provided including a message queue 250 which enqueues messages 215 or sets of messages 215. Each thread 210 individually maintains its own connections with the broker 195 in which there are two distinct types of connections; specifically, a push connection 225 (e.g., established by the broker) over which the broker 195 pushes messages 216 to the respective threads 210 and a pull connection 230 (e.g., established by the thread having received a pushed message 216) via which the threads 210 themselves initiate retrieval and thus pull messages 217 from the broker's message queue.

According to the depicted embodiments, the messages 215 are enqueued at the message queue 250 as multiple individual messages 215, yet a sub-set of the enqueued messages may nevertheless be related to one another by any of a variety of criteria.

In operation, the broker 195 initially pushes a message 216 to one of the threads 210 via the push connection 225 pursuant to which the broker 195 will dequeue the pushed message 216 from the message queue 250. Once the pushed message 216 arrives at the respective thread 210, that identical thread 210 opens a new pull connection 230 back to the broker 195 and then pulls additional related messages 217 over to the thread 210 making the request via the pull connection 230, resulting in a single thread having multiple messages (e.g., at least a pushed message 216 and one or more pulled messages 217) from the broker 195 and additionally having multiple connections (e.g., the push connection 225 and the pull connection 230) with the broker 195. For instance, such related messages may be additional messages of a same time as the pushed message 216 or may be different additional messages selected according to configurable criteria. The broker 195 will then bulk-dequeue the pulled messages 217 from the message queue 250. In certain embodiments, multiple distinct brokers 195 operate within the host organization in the same manner as described but provide additional capacity for the handling of messages in bulk or individually.

Returning to the second connection between the thread 210 and the broker 195, the pull connection 230 as established by the thread 210, it is notable that the establishment of a second pull connection 230 to the broker violates the principles of availability and transactionality of conventional message handlers in asynchronous processing implementations because with two distinct connections to the same broker 195, if one of the sessions at a thread 210 are committed to the database 155, then an inconsistent state has potentially been allowed due to the pushed message 216 having initially been distributed by the broker 195 via the push connection 225 and the pulled message(s) 217 having been pulled down to the thread 210 via the pull connection 230. Stated differently, it is no longer a matter of committing the session upon completion of an individual message, but rather, both sessions must be appropriately committed accounting for both the push connection 225 and the pull connection 230. While conventional solutions do not encounter such an issue, the conventional solutions are likewise wholly unable to support bulk processing as noted previously.

Thus, additional means are provided by which to track the stage of the messages at the threads 210 to ensure that commits are carried out appropriately and further that database availability and database transactionality are observed.

Figure 3:
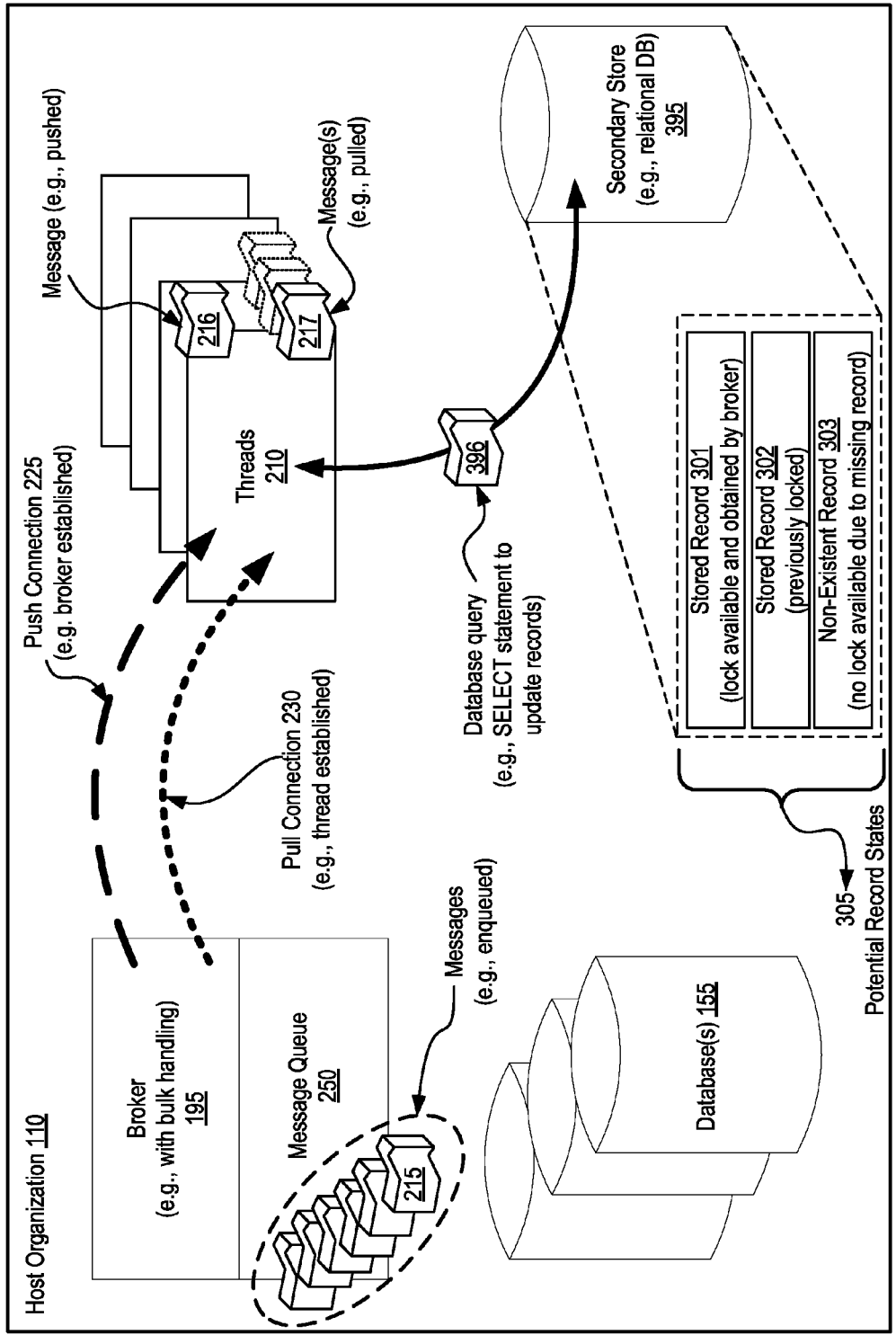
FIG. 3 depicts interactions with the broker from FIGS. 1 and 2 in still further detail.

FIG. 3 depicts interactions with the broker 195 from FIGS. 1 and 2 in still further detail. The host organization 110 and its database(s) 155 are again shown here, along with the broker 195, however, still further detail is now provided showing the database query or queries 396 and the various potential record states 305.

According to the described embodiments the broker 195 implements an at least once delivery semantic so as to provide a consistent view of queued messages 215 within the message queue 250 as well as to ensure that duplicate messages are prevented from being enqueued with the same message existing as multiple instances within the message queue 250. Conventional implementations do not require such functionality as they do not provide support for bulk handling of messages, and as such, there is no risk of enqueuing duplicate messages.

Once the pushed message 216 and the pulled messages 217 are under control of the thread 210, the thread 210 leverages secondary store 395 so that the thread 210 may determine which messages (216, 217) are eligible for processing and which messages (216, 217) are ineligible for processing due to having already been processed or due to such messages currently undergoing processing by another thread, etc. In such a way, the at least once delivery semantic of the broker 195 is funneled through an at most once semantic determinable and enforceable by the thread 210 by leveraging the information recorded within the secondary store 395. The secondary store 395 (e.g., any relational database) operates as a separate and distinct data repository from the underlying database(s) 155 which store user and customer data on behalf of customer organizations or other subscribers of the host organization. The secondary store 395 is used to track the stage of messages and importantly, to ensure that any particular message undergoes processing only once according to the at most once semantic determined and enforced by the thread 210, but additionally is used to ensure that messages are not lost or orphaned and consequently never processed.

In the secondary store 395 messages are recorded exactly once and then locks are obtained on the message's representation in the secondary store 395 to guarantee uniqueness for that message while it undergoes processing. For instance, the message's corresponding representation in the secondary store 395 may simply be a stored record in a relational database, but may be implemented in any manner which ensures uniqueness for that message. According to one embodiment, the message's corresponding representation in the secondary store 395 may constitute a copy of the message enqueued by the broker 195.

So as to ensure that no other thread 210 is working on a message to undergo processing, the thread 210 obtains a lock on a stored record 301 in the secondary store 395 which additionally prevents any other thread 210 from subsequently pulling the message for processing. As depicted here, the stored record 301 has a lock available, and thus, the lock is obtained at that time by the thread 210.

By requesting and obtaining the lock on the stored record 301 the thread 210 ensures that no other concurrently executing thread 210 may pull the record's corresponding message for processing even in the event that another thread 210 is pushed such a message by the broker 195 or pulls such a message from the broker 195.

Such a scheme ensures uniqueness for any given message and thus maintains transactionality and availability because even if a message is erroneously re-queued after processing, processed but not dequeued, or otherwise mis-handled, the secondary store 395 will nevertheless guarantee that each message received at the broker is never processed more than once. Further still, where multiple brokers 195 are present, each managing a subset of enqueued messages so as to increase message handling capacity, the stored record 301 in the secondary store 395 ensures that even if another concurrently executing broker 195 takes authority over an enqueued message that is already being handled by another broker instance, then such a message now being erroneously enqueued and handled by multiple brokers still cannot be processed more than once due to the threads 210 enforcing the at most once processing semantic.

With respect to maintaining a high availability system, the at least once delivery semantic ensures that all messages are enqueued at least once but permits them, in the case of failure or other abnormal processing, to be enqueued more than once, while at the same time preventing such messages having multiple identical instances enqueued from being processed more than once.

The hashed box coming from the secondary store 395 depicts that there are multiple potential record states 305 which are assessed to determine how processing should or should not proceed for any given record by the respective thread 210 handling that particular message. As described above, stored record 301 indicates that a record exists in the secondary store 395, that a lock is available for such a record, and that a lock is thus obtained by the thread 210 for such a record, pursuant to which the corresponding message to that record may appropriately undergo processing via the respective thread 210.

Stored record 302 indicates that a record exists in the secondary store 395 for a corresponding message, but that the record was previously locked, and as such, the thread 210 cannot obtain a requested lock for that record and thus, the thread 210 will not proceed to process the message notwithstanding the fact it has possession of the message. Similarly, any thread 210 using a pull connection 230 to retrieve messages from the broker 195 will fail to obtain a lock on the record and as such, the corresponding message will not be processed by that thread 210 even where an explicit request is attempted. A stored record 302 that is previously locked is likely undergoing processing at the time that a subsequent request is made because after processing successfully completes and the results are committed to the databases 155 the corresponding record for a message is deleted from the secondary store 395. Abnormal processing, however, may result in a stored record 302 that is previously locked but not presently undergoing processing.

Non-existent record 303 indicates that no lock is available due to a missing record in the secondary store 395. This occurs where a message is enqueued multiple times or requeued despite processing having completed successfully via one of the threads 210 resulting in the corresponding record for the processed message having been appropriately and correctly deleted from the secondary store 395.

During regular processing, the broker 195 has many messages enqueued and the broker distributes or pushes messages to random threads 210 connected with the broker via the push connections 225 and awaiting messages for processing. Where multiple instances of the same message are erroneously enqueued by a broker or multiple broker instances, it is possible that the same message is pushed to multiple threads for processing, violating database transactionality due to the same work or the same database transaction embodied by such a message being transacted multiple times. Thus, by requiring that a lock be obtained on a record in the secondary store 395 the thread 210 will forgo processing for those messages due to the inability to obtain a requested lock. An alternative embodiment is provided where the threads obtain the lock from the secondary store 395 for messages received from the broker via the push or pull connections and where the lock is obtainable, processing commences for such messages, but where a lock is not obtainable due either to a record being previously locked or due to a record being non-existent, then the processing will not commence for such a message.

Such an architecture enables bulk handling in an asynchronous processing environment by allowing for multiple connections (e.g., both push and pull connections) between worker threads 210, servers, grid units, blades, servers in a server pool, etc., back to either a single broker or back to one of many broker instances without violating transactionality and while maintaining high availability in a high volume system that supported by a hosted computing architecture. The distributed architecture further permits many threads 210 to work on messages concurrently as well as to pull related messages that are part of a set of messages without resulting in duplicative processing of messages or orphaned messages failing to process, even in the face of abnormal processing, faults, or erroneous termination of processing of any given message at any given thread.

In the case where a thread 210 is pushed a message for processing or pulls a message for processing and a lock is successfully obtained for the records in the secondary store 395 corresponding to those messages there are two feasible outcomes. Successful processing will result in the message being dequeued by the message queue 250 due to acceptance at a thread (regardless of push or pull), locks obtained on the record(s) corresponding to the message(s), processing of the computational workload associated with such a message being completed successfully with results committed to the database(s) 155, and a corresponding removal or deletion of the records from the secondary store 395. Any further attempt to process the same message, for instance, if there is a duplicative message still enqueued, will not be permitted as a corresponding record will no longer exist in the secondary store and thus, no lock is obtainable by the thread 210 attempting to process such a message.

If processing of a message faults somewhere along the workflow then the corresponding record will not be removed from the secondary store 395, however, the record may remain locked, despite processing no longer being undertaken for the corresponding message. Various clean up mechanism are thus feasible, including, for example, after a pre-determined period of time the message may be requeued with the broker 195 in the message queue 250 and when the lock expires, the message may then be re-attempted for processing. If a message is re-queued and the prior instance of the message successfully completes at a thread 210 then the stored record will be deleted from the secondary store 395 upon commit to the databases 155, thus once again preventing any subsequent attempt at processing the message from obtaining a lock and commencing processing.

In the context of bulk processing of multiple messages concurrently the processing, message candidate selection, and determination of potential record states 305 undergoes additional processing. First, as described above, a message is pushed by the broker to the thread 210 via the push connection 225 for processing, subsequent to which the thread 210 having received the message then establishes a pull connection 230 back to the broker 195 and requests additional candidate messages for bulk processing, which are then provided to the thread 210 via the pull connection 230. The candidate messages may be identified by the thread 210 making the request by specifying the message by a common key. In alternative embodiments, it is possible to specify the message directly by a message identifier or message ID. In either scenario, the thread 210 requests messages from the broker which in turn identifies and returns related messages to the thread 210 for bulk processing via the pull connection 230. In other embodiments, the initial message pushed to the thread contains an enumerated set of other messages to be concurrently bulk processed, or a range of message IDs to be concurrently bulk processed. According to certain embodiments, an enqueued message includes a flag indicating that it is to be bulk processed with other enqueued messages. In other embodiments, the enqueued message includes a quantity or value or range specifying how many additional messages are to be concurrently processed in bulk with the enqueued message. For example, an enqueued message may contain a configurable value within which a user, application, API, query optimizer, or any other entity which originates such messages may specify the quantity of messages to be concurrently processed in bulk with the enqueued message.

Bulk processing, or the concurrent processing of many messages as a group within at a single thread (e.g., at a single worker thread, at a single server of a server pool, at a single grid unit or computing blade, etc) is sometimes beneficial where the computational workload to accomplish a set of related tasks is very large. For instance, when issuing very long writes into the database 155, deleting many records simultaneously, or other processing of very long or computationally intensive SQL statements and database queries, some efficiency may be gained by grouping and executing the messages together as a set of messages. For instance, it is more efficient to tell a database 155 to delete a large group or range of records than it is to issue a delete for a first record ID, and then issue a second delete for a second record ID and then a third, and so forth. Each message and each database query, instruction, transaction, etc., incurs its own computational overhead costs, such as the cost of multiple transports, multiple searches through the database to locate the appropriate records, multiple transactions, and so forth. If messages are compatible for grouping together and concurrent processing as a group then overall operational efficiency of the hosted computing architecture may be improved. Such grouping is especially feasible where the messages embody database transactions of the same type.

For example, an enqueued message may have a type corresponding to an email which is one part of a mass email campaign to be executed. If a user is sending out 1000 emails in bulk then it would be wasteful to individually process each email and wait for the web-browser to respond, and then process a second one of the 1000 emails, and so forth. Rather, a server translator can be sent the configuration for the mass e-mail campaign which in turn originates and enqueues a message through the broker that specifies to process the 1000 emails as a bulk transaction. Even if 1000 individual messages are originated that are capable of being processed individually, it may be more computationally efficient to process them together, and the described mechanisms for bulk processing in an asynchronous processing environment enable such an option within the hosted computing architecture. For instance, with bulk processing, a single connection may be established to the email server, the 1000 emails sent, and then a single disconnect, thus saving the costly overhead with creating an additional 999 connections and disconnections to the same email server. Similarly, if transacting with a database 155, opening a single connection, issuing the inserts, updates, deletes, searches, etc., in bulk, and then performing a single disconnect will yield computational efficiencies over performing each of the many transactions individually which in turn requires a connection and disconnect for each individually executed transaction.

Where messages cannot be combined for bulk processing the broker 195 remains fully operable with the enqueuing, dispatch, processing, and dequeue of individual message, thus providing backward compatibility with existing tools, APIs, applications, and so forth.

In certain embodiments the message originator (e.g., an API, application, GUI interface, programmer, etc.) designs the messages presented to the broker 195 in such a way that the messages are dictated for bulk processing as a set of messages. In other embodiments, a query interface or query optimizer (e.g., refer to elements 180 and 160 of FIG. 1) modifies messages and database query requests to provide the grouping on behalf of the message originator. Such grouping may occur outside the view of the user (e.g., without the user's knowledge) or the user may be notified or the user may be presented with the option to perform the grouping with a request for the user's consent, depending upon the chosen implementation and configuration of the embodiments as are described herein.

Regardless of how the candidate messages for bulk processing are identified, a set of messages is established for bulk processing at a thread 210 and a determination of which of the potential record states 305 exists for each of the messages in the set of messages then constitutes the issuance of two database queries to answer three questions. First, a lock is requested and attempted to be obtained for the stored records in the secondary store 395 corresponding to the set of messages. In one embodiment the first database query 396 is an update issued against the record in the secondary store 395 which will lock the corresponding stored records 301 if the records exists in the database and where a lock is available for all the records corresponding to the set of messages (e.g., the records are not presently locked by another entity). If any one of the records corresponding to the set of messages cannot be locked then the database query 396 will return indicating the lock cannot be obtained. This will either be caused by at least one of record of the set no longer existing within the secondary store 395 or due to at least one of the records presently being locked within the secondary store 395, thus causing the database query to fail to attain a lock for the full set of records corresponding to the set of messages. In certain embodiments the database query is conducted via SQL using a "SELECT" statement command term specifying the set of records to be locked (e.g., by key, by message ID, by range, or by other relevant criteria), but other conventional database query 396 means are feasible.

If a lock is obtained for the specified set of records (e.g., a stored records 301), then processing commences as normal for the entire set of messages.

If a lock cannot be obtained for the entire set of records corresponding to the set of messages to be processed then a second database query 396 is issued to determine whether the cause is due to one or more of the records being locked within the secondary store 395 or due to one or more of the records being non-existent in the secondary store 395. For instance, a basic SELECT command term may be issued via SQL, without requesting an update, which will then return all the records that exist within the secondary store 395 corresponding to the set of messages regardless of whether or not they are locked, from which a simple differential comparison to the complete set of records returned corresponding to the set of messages to be bulk processed will identify those messages that no longer exist within the secondary store. For instance, if ten records are queried for and nine records are returned then the comparison will reveal which record that is known from the set of messages is missing from the returned record set from the secondary store 395.

Unfortunately, where two database queries are required to determine the state of the records it is possible that the state of the records has changed between the time that the first and the second of the two database queries occur. For instance, with ten records, it is feasible that one existed but was locked when the first database query issued, but subsequently, processing finished for the message corresponding to the locked record, changes were committed to the database 155, and the corresponding record in the secondary store 395 was then deleted, resulting in the previously locked stored record 302 now being a non-existent record 303. Transitions from locked to unlocked may occur where a message is dispatched for processing and thus its corresponding record is locked, but then a thread 210 does not accept the message, resulting in the message quickly being re-queued in the message queue and the corresponding record unlocked. Other abnormal flows exist where a record is locked but then not processed, thus requiring the message to be re-queued and the corresponding record's lock being released. For instance, processing may be migrated to a different protocol not requiring a lock.

Graceful processing of stored records which undergo unexpected or unknown state changes is nevertheless accommodated by the above database query 396 order and determination of the potential record states. For instance, if record transition from locked to unlocked between the first and second database queries 396 then processing at the thread 210 will fail to sweep the corresponding set of messages into another stage, causing a delay, but not a fault. More specifically, the set of messages will either remain enqueued or be requeued as necessary and when a subsequent attempt is made to process the set of records, the first database query 396, when repeated on the subsequent iteration, will successfully obtain its lock and processing will commence as normal. If any of the records transition from a stored record 302 that is previously locked to a non-existent record 303, then again, there is no problem with availability or transactionality or consistency in the database 155 because the non-existent record 303 merely indicates that processing successfully completed, was committed to the database 155, and the record was appropriately removed from the secondary store 395, permitting the enqueued message to simply be discarded without worry of an orphaned message or a message for work that will never be undertaken.

According to certain embodiments, if an enqueued message is received at or retrieved by a thread 210 for processing and the message's corresponding record is non-existent 303 in the secondary store 395 then the message is deemed to be an erroneous duplicate and simply discarded. If the message's corresponding stored record 302 is previously locked then the message is re-enqueued with the broker's 195 message queue 250 for future processing.

Figure 4:
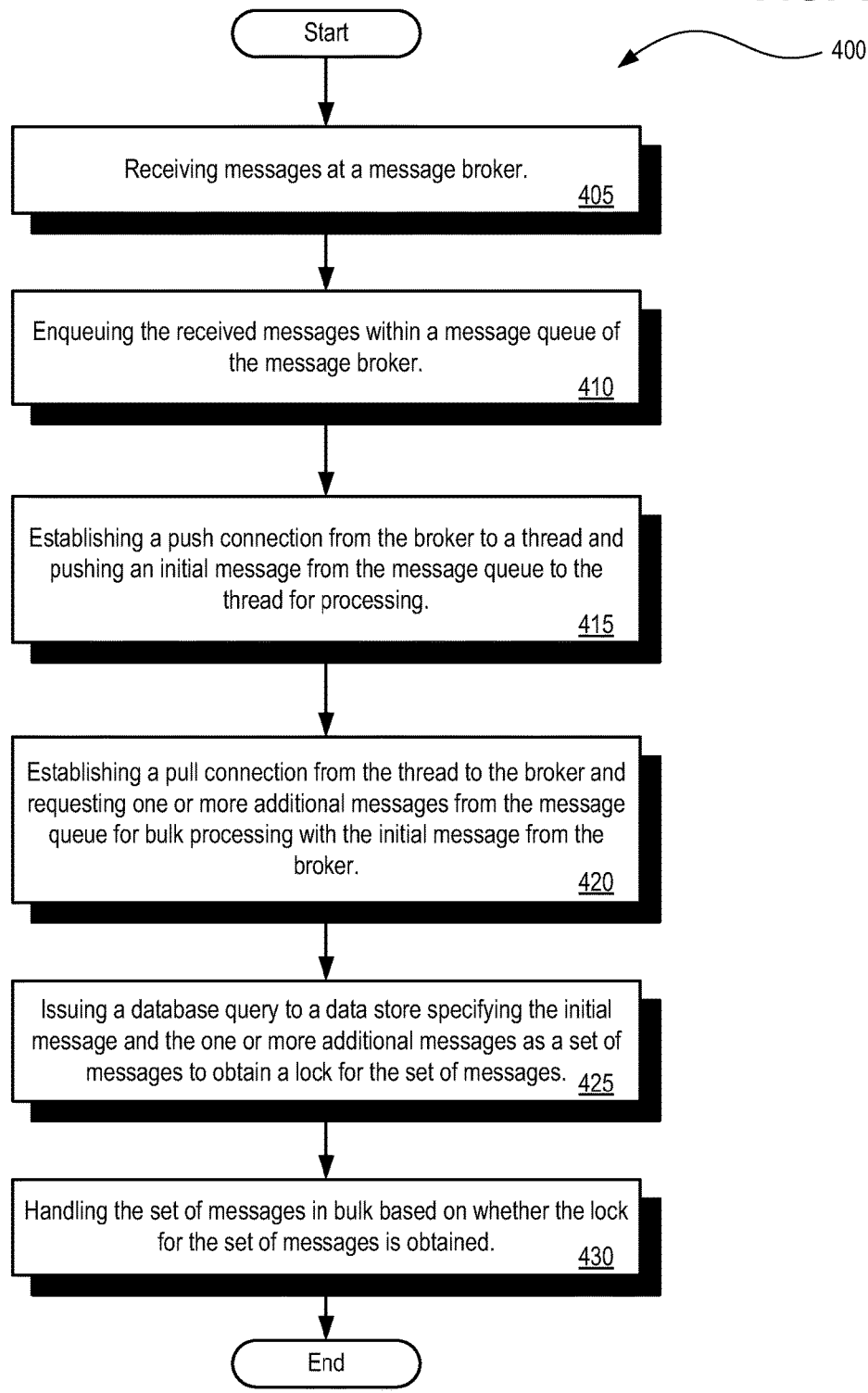
FIG. 4 is a flow diagram illustrating a method for implementing bulk handling in asynchronous processing in accordance with disclosed embodiments.

FIG. 4 is a flow diagram illustrating a method 400 for implementing bulk handling in asynchronous processing in accordance with disclosed embodiments. Method 400 may be performed by processing logic that may include hardware (e.g., circuitry, dedicated logic, programmable logic, microcode, etc.), software (e.g., instructions run on a processing device to perform various operations such as storing records, processing transactions, executing, providing, determining, linking, receiving, displaying, retrieving, communicating, updating, transmitting, sending, returning, etc., in pursuance of the systems, apparatuses, and methods, as described herein. For example, the computing architecture (e.g., within production environment 111) of host organization 110 as depicted at FIG. 1, the system 500 at FIG. 5, the environments 698 and 699 at FIGS. 6A and 6B respectively, or the machine 700 at FIG. 7, may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 405, processing logic receives messages at a message broker.

At block 410, processing logic enqueues the received messages within a message queue of the message broker.

At block 415, processing logic establishes a push connection from the broker to a thread and pushes an initial message from the message queue to the thread for processing.

At block 420, processing logic establishes a pull connection from the thread to the broker and requests one or more additional messages from the message queue for bulk processing with the initial message from the broker.

At block 425, processing logic issues a database query to a data store specifying the initial message and the one or more additional messages as a set of messages to obtain a lock for the set of messages.

At block 430, processing logic handles the set of messages in bulk based on whether the lock for the set of messages is obtained.

According to another embodiment, method 400 further includes obtaining the lock for the set of messages responsive to the database query; processing the set of messages concurrently in bulk; and determining processing of the set of messages was successful.

According to another embodiment, method 400 further includes de-queuing the set of messages from the message queue of the message broker; and issuing a new database query to the data store to delete all records corresponding to the set of messages successfully processed and committing the delete.

According to another embodiment of method 400, the data store includes a relational database to store records corresponding to the messages received and enqueued by the broker; in which issuing the database query to the data store includes issuing an update via the database query specifying the initial message and the one or more additional messages as the set of messages to obtain the lock for the set of messages; and in which the lock for the set of message is obtained responsive to the database query when a record exists in the relational database for each of the messages in the set and additionally when the record is not already subject to a lock.

According to another embodiment, method 400 further includes issuing a second database query to the data store responsive to the lock for the set of messages not being obtained, in which the second database query specifies records corresponding to each of the messages in the set via a SELECT statement within an SQL query; and receiving a record set from the data store responsive to the SELECT statement listing all records in the data store corresponding to the messages in the set that presently exist within the data store regardless of whether or not the records are locked.

According to another embodiment, method 400 further includes determining which records corresponding to the set of messages are non-existent in the data store as having been previously deleted based on a differential comparison between the messages in the set and the record set returned responsive to the SELECT statement; in which the initial message and the one or more additional messages for bulk processing with the initial message embody database transactions to be processed against a first database within the host organization, the first database storing customer data; and in which the data store includes a second database to store records corresponding to the messages received and enqueued by the broker.

In accordance with a particular embodiment, there is non-transitory computer readable storage media having instructions stored thereon that, when executed by a processor of a system, the instructions cause the system to perform operations including: receiving messages at a message broker; enqueuing the received messages within a message queue of the message broker; establishing a push connection from the broker to a thread and pushing an initial message from the message queue to the thread for processing; establishing a pull connection from the thread to the broker and requesting one or more additional messages from the message queue for bulk processing with the initial message from the broker; issuing a database query to a data store specifying the initial message and the one or more additional messages as a set of messages to obtain a lock for the set of messages; and handling the set of messages in bulk based on whether the lock for the set of messages is obtained.

Figure 5:
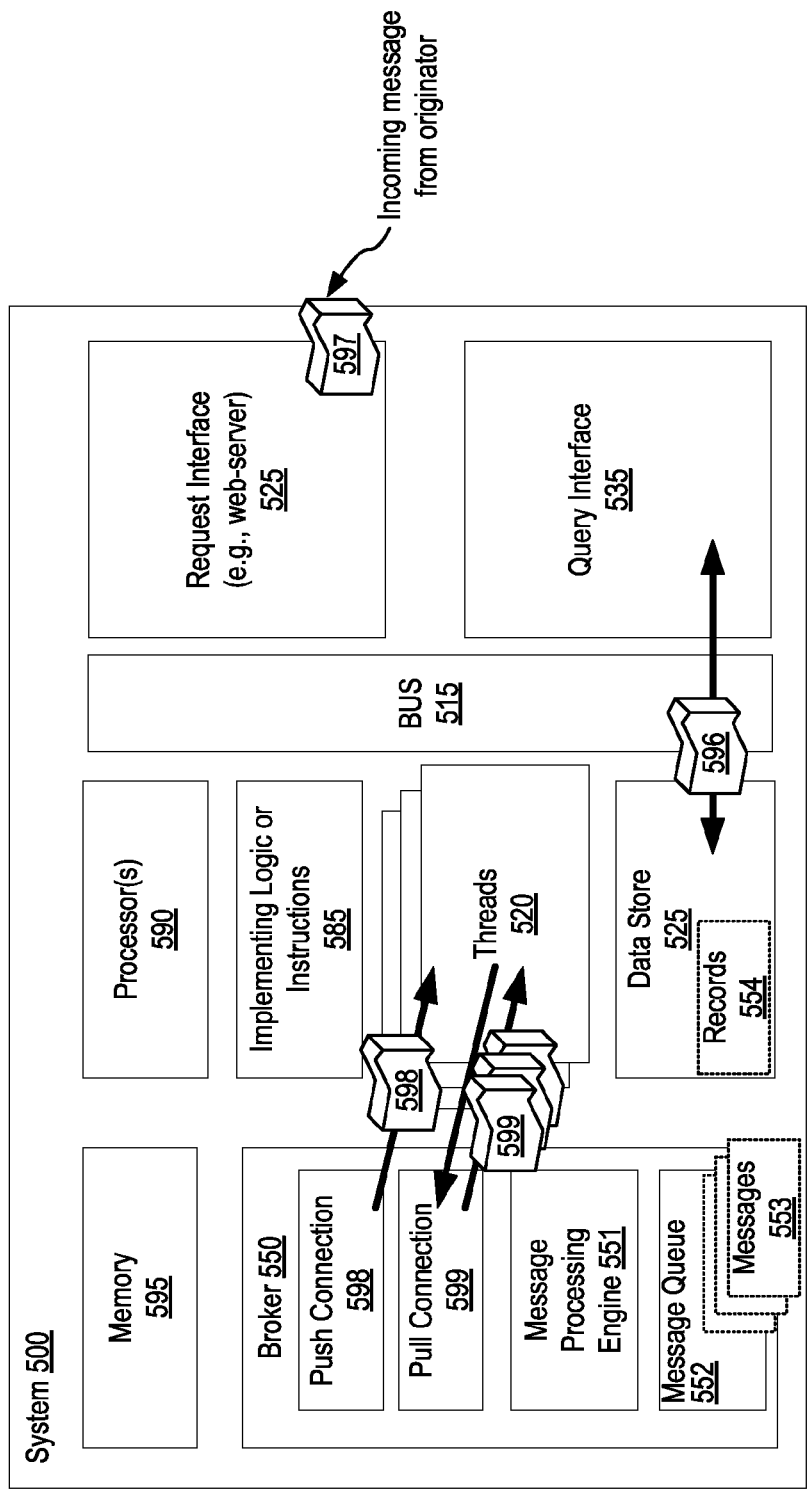
FIG. 5 shows a diagrammatic representation of a system in accordance with which embodiments may operate, be installed, integrated, or configured.

FIG. 5 shows a diagrammatic representation of a system 500 in which embodiments may operate, be installed, integrated, or configured.

In accordance with one embodiment, there is a system 500 having at least a processor 590 and a memory 595 therein to execute implementing logic and/or instructions 585. Such a system 500 may execute within a hosted computing environment, such as a host organization, a multi-tenant environment, an on-demand service provider, a cloud based service provider, etc.

According to the depicted embodiment, the system 500 includes the processor 590 and the memory 595 to execute instructions at the system 500; a broker 550 to enqueue received messages 597 as enqueued messages 553; a push connection 598 from the broker 550 to a thread 520, in which the broker 550 is to push an initial message 598 to the thread 520 for processing; a pull connection 599 from the thread 520 to the broker 550, in which the thread 520 is to request one or more additional messages 599 for bulk processing with the initial message 598 from the broker 550; a query interface 535 to issue a database query 596 from the thread 520 to a data store 525, the database query 596 specifying the initial message 598 and the one or more additional messages 599 as a set of messages to obtain a lock for the set of messages; and a message processing engine 551 to handle the set of messages in bulk based on whether the lock for the set of messages is obtained.

According to another embodiment of the system 500, the lock for the set of messages is obtained responsive to the database query; and in which the set of messages is processed by the message processing engine concurrently in bulk.

According to another embodiment of the system 500, subsequent to successful processing of the set of messages concurrently in bulk by the message processing engine the query interface deletes records corresponding to the set of messages from the data store and commits the delete.

According to another embodiment of the system 500, the data store includes a relational database to store records corresponding to the messages received and enqueued by the broker.

According to another embodiment of the system 500, the query interface to issue a database query from the thread to the data store includes issuing an update via the database query specifying the initial message and the one or more additional messages as the set of messages to obtain the lock for the set of messages; and in which the lock for the set of message is obtained responsive to the database query when a record exists in the relational database for each of the messages in the set and additionally when the record is not already subject to a lock.

According to another embodiment of the system 500, the query interface is to issue a second database query from the thread to the data store responsive to the lock for the set of messages not being obtained, in which the second database query specifies records corresponding to each of the messages in the set via a SELECT statement within an SQL query; and in which the data store returns a record set responsive to the SELECT statement listing all records in the data store corresponding to the messages in the set that presently exist within the data store regardless of whether or not the records are locked.

According to another embodiment of the system 500, the message processing engine is to further determine which records corresponding to the set of messages are non-existent in the data store as having been previously deleted based on a differential comparison between the messages in the set and the record set returned responsive to the SELECT statement.

According to another embodiment of the system 500, the initial message and the one or more additional messages for bulk processing with the initial message embody database transactions to be processed against a first database within the host organization, the first database storing customer data; and in which the data store includes a second database to store records corresponding to the messages received and enqueued by the broker.

According to another embodiment of the system 500, the first database within the host organization storing customer data includes a multi-tenant database system of the host organization storing customer data on behalf of a plurality of separate and distinct customer organizations; and in which the second database includes a relational database operated within the host organization to store the records corresponding to the messages received and enqueued by the broker without being accessible to any of the plurality of separate and distinct customer organizations which utilize the multi-tenant database system.

According to another embodiment of the system 500, each of the plurality of separate and distinct customer organizations which utilize the multi-tenant database system is an entity selected from the group consisting of: a separate and distinct remote organization, an organizational group within the host organization, a business partner of the host organization, or a customer organization that subscribes to cloud computing services provided by the host organization.

According to another embodiment, the system 500 further includes a message queue 552 to enqueue the received messages 597 as enqueued messages 553 at the direction of the broker 550.

According to another embodiment of the system 500, the initial message pushed to the thread for processing includes a flag indicating the initial message is to be processed in bulk concurrently with other enqueued messages.

According to another embodiment of the system 500, the initial message pushed to the thread for processing includes information specifying other enqueued messages are to be processed in bulk concurrently with the initial message, in which the information includes at least one of: a bulk processing flag; an enumerated set of additional message IDs to be processed concurrently with the initial message; a message type for which additional messages having the same message type are to be processed in bulk concurrently with the initial message; a range of message IDs to be processed concurrently with the initial message; search criteria to locate one or more additional messages to be processed concurrently with the initial message; and a quantity or numerical quantity range of additional messages to be processed concurrently with the initial message.

According to another embodiment of the system 500, the message processing engine analyzes the initial message for a flag, count, search criteria, enumerated set, or message type and subsequently retrieves the one or more additional messages from the broker to be processed concurrently with the initial message.

According to another embodiment of the system 500, the message processing engine determines the lock for the set of messages is not obtained; in which the query interface issues a second database query requesting a record set corresponding to the set of messages; in which the message processing engine re-enqueues any message of the set determined to exist within the data store but for which a lock cannot be obtained; and in which the message processing engine discards any message of the set determined to no longer exist as a record within the data store.

According to another embodiment of the system 500, any message for which a lock is obtained pursuant to the first database query indicates a record corresponding to the message exists in the data store and is not actively undergoing processing by any thread; in which any message for which a lock is not obtained pursuant to the first database query and which is determined to exist within the data store pursuant to the second database query indicates a record corresponding to the message exists in the data store but is actively undergoing processing by another thread or processing of the message by another thread has terminated abnormally and will be handled by future processing after re-enqueuing of the corresponding message with the broker; and in which any message for which a lock is not obtained pursuant to the first database query and which is determined to be non-existent exist within the data store pursuant to the second database query indicates processing of the message by another thread successfully processed and deleted the corresponding record from the data store and the message may be permissibly discarded as an erroneous duplicate message.

According to another embodiment of the system 500, the thread constitutes one thread among a plurality of threads available for processing the received messages on behalf of the host organization; and in which each thread is one of a server in a pool of servers, a computing blade amongst a group of blades, a single computer node within a computing grid; a processing work thread executing via processor cores amongst a plurality of processing work threads; or one of a plurality of computing nodes amongst a distributed network of computing nodes.

Bus 515 interfaces the various components of the system 500 amongst each other, with any other peripheral(s) of the system 500, and with external components such as external network elements, other machines, client devices, etc., including communicating with such external devices via a network interface over a LAN, WAN, or the public Internet. Query interface 535 provides functionality to pass queries from the request interface 525 (e.g., web-server) into a multi-tenant database system for execution against its databases or other data stores of the host organization's production environment as depicted in additional detail at FIG. 1.

Figure 6A:
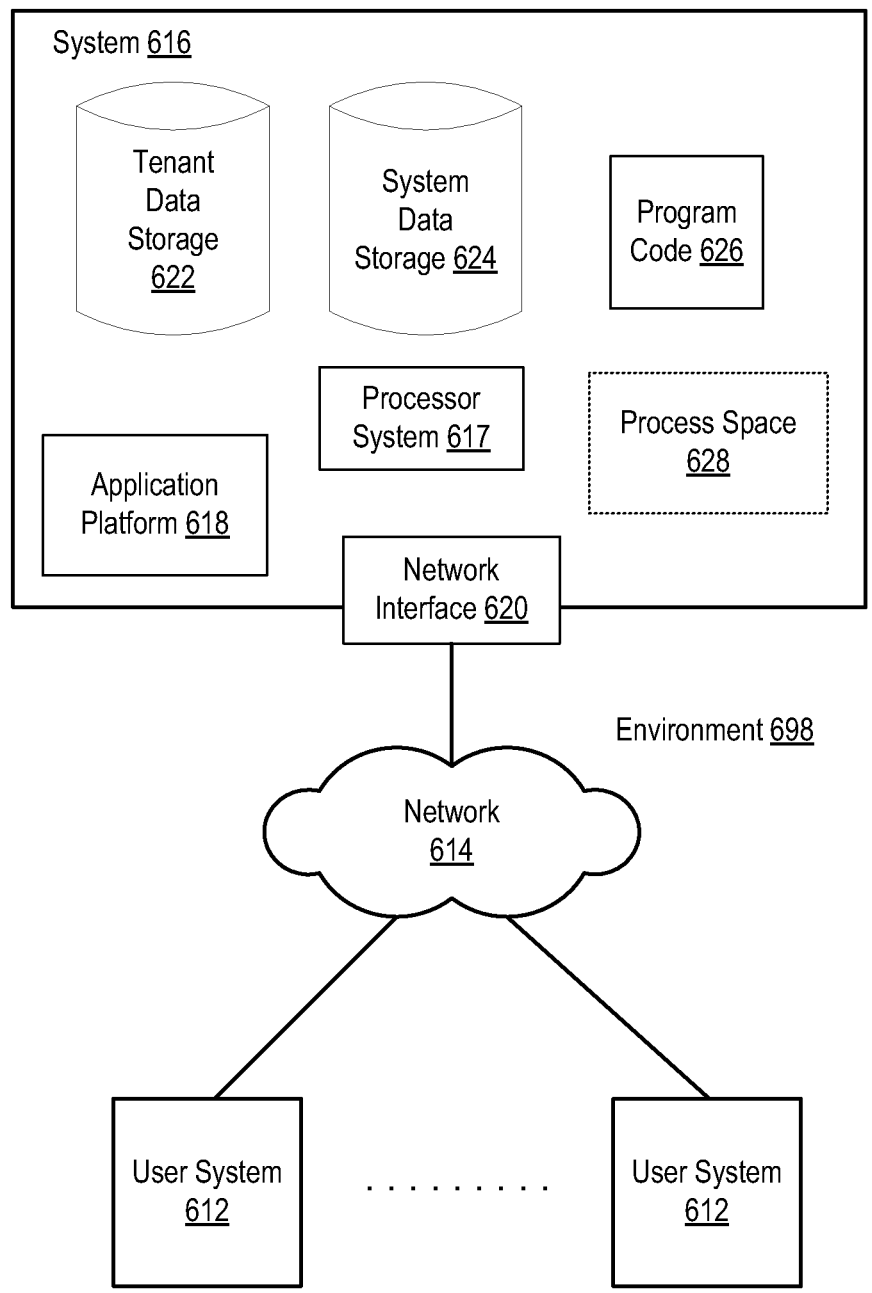
FIG. 6A illustrates a block diagram of an environment in which an on-demand database service may operate in accordance with the described embodiments.

FIG. 6A illustrates a block diagram of an environment 698 in which an on-demand database service may operate in accordance with the described embodiments. Environment 698 may include user systems 612, network 614, system 616, processor system 617, application platform 618, network interface 620, tenant data storage 622, system data storage 624, program code 626, and process space 628. In other embodiments, environment 698 may not have all of the components listed and/or may have other elements instead of, or in addition to, those listed above.

Environment 698 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6A (and in more detail in FIG. 6B) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6A, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6A, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6A include conventional, well-known elements that are explained only briefly here. For example, each user system 612 may include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6B:
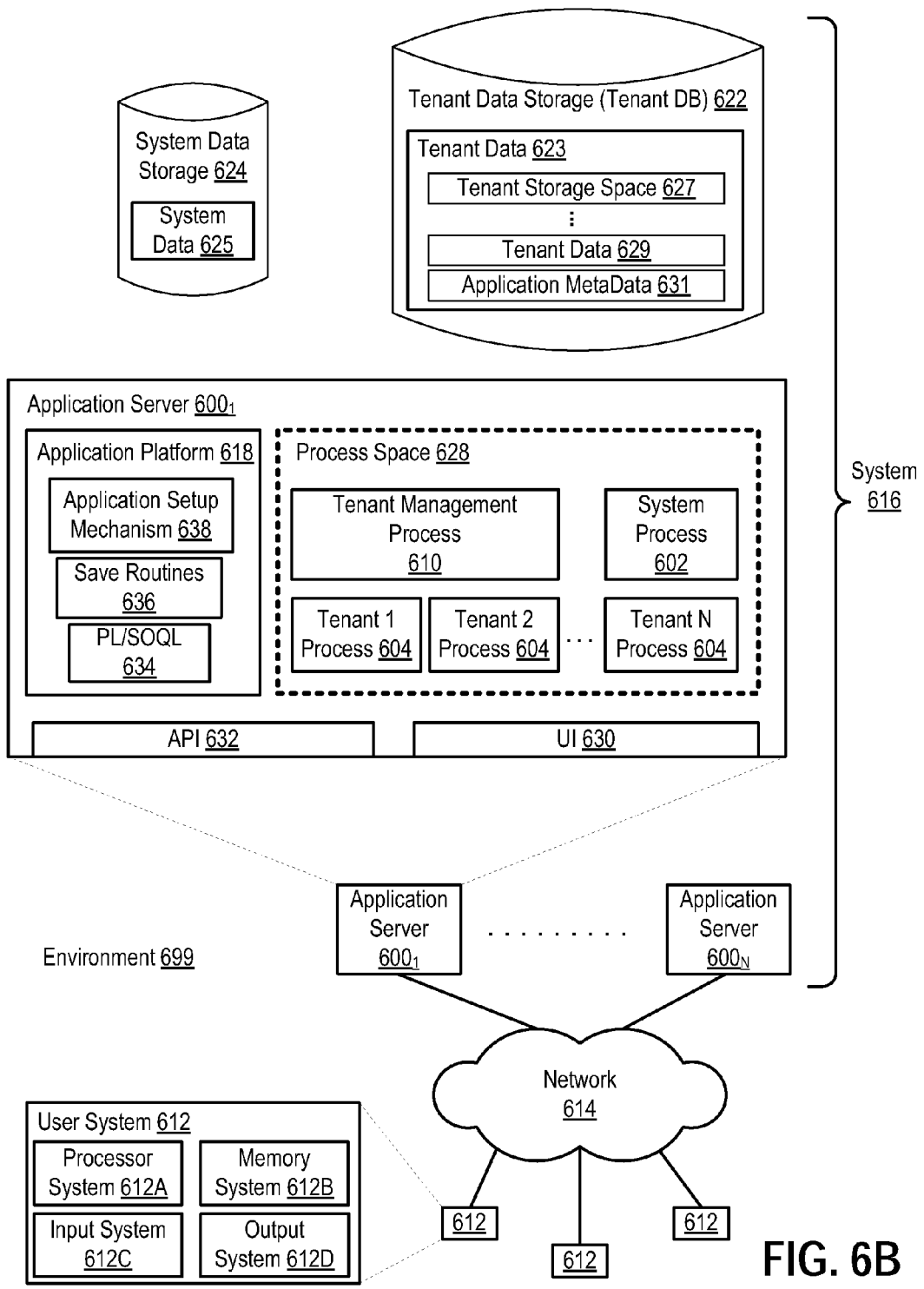
FIG. 6B illustrates another block diagram of an embodiment of elements of FIG. 6A and various possible interconnections between such elements in accordance with the described embodiments.

FIG. 6B illustrates another block diagram of an embodiment of elements of FIG. 6A and various possible interconnections between such elements in accordance with the described embodiments. FIG. 6B also illustrates environment 699. However, in FIG. 6B, the elements of system 616 and various interconnections in an embodiment are illustrated in further detail. More particularly, FIG. 6B shows that user system 612 may include a processor system 612A, memory system 612B, input system 612C, and output system 612D. FIG. 6B shows network 614 and system 616. FIG. 6B also shows that system 616 may include tenant data storage 622, having therein tenant data 623, which includes, for example, tenant storage space 627, tenant data 629, and application metadata 631. System data storage 624 is depicted as having therein system data 625. Further depicted within the expanded detail of application servers $600_{1-N}$ are User Interface (UI) 630, Application Program Interface (API) 632, application platform 618 includes PL/SOQL 634, save routines 636, application setup mechanism 638, process space 628 includes system process space 602, tenant 1-N process spaces 604, and tenant management process space 610. In other embodiments, environment 699 may not have the same elements as those listed above and/or may have other elements instead of, or in addition to, those listed above.

User system 612, network 614, system 616, tenant data storage 622, and system data storage 624 were discussed above in FIG. 6A. As shown by FIG. 6B, system 616 may include a network interface 620 (of FIG. 6A) implemented as a set of HTTP application servers 600, an application platform 618, tenant data storage 622, and system data storage 624. Also shown is system process space 602, including individual tenant process spaces 604 and a tenant management process space 610. Each application server 600 may be configured to tenant data storage 622 and the tenant data 623 therein, and system data storage 624 and the system data 625 therein to serve requests of user systems 612. The tenant data 623 might be divided into individual tenant storage areas (e.g., tenant storage space 627), which can be either a physical arrangement and/or a logical arrangement of data. Within each tenant storage space 627, tenant data 629, and application metadata 631 might be similarly allocated for each user. For example, a copy of a user's most recently used (MRU) items might be stored to tenant data 629. Similarly, a copy of MRU items for an entire organization that is a tenant might be stored to tenant storage space 627. A UI 630 provides a user interface and an API 632 provides an application programmer interface into system 616 resident processes to users and/or developers at user systems 612. The tenant data and the system data may be stored in various databases, such as one or more Oracle™ databases.

Application platform 618 includes an application setup mechanism 638 that supports application developers' creation and management of applications, which may be saved as metadata into tenant data storage 622 by save routines 636 for execution by subscribers as one or more tenant process spaces 604 managed by tenant management process space 610 for example. Invocations to such applications may be coded using PL/SOQL 634 that provides a programming language style interface extension to API 632. Invocations to applications may be detected by one or more system processes, which manages retrieving application metadata 631 for the subscriber making the invocation and executing the metadata as an application in a virtual machine.

Each application server 600 may be communicably coupled to database systems, e.g., having access to system data 625 and tenant data 623, via a different network connection. For example, one application server $600_1$ might be coupled via the network 614 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 612 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user may hit three different application servers 600, and three requests from different users may hit the same application server 600. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 600 to request and update system-level and tenant-level data from system 616 that may require sending one or more queries to tenant data storage 622 and/or system data storage 624. System 616 (e.g., an application server 600 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7 illustrates a diagrammatic representation of a machine 700 in the exemplary form of a computer system, in accordance with one embodiment, within which a set of instructions, for causing the machine/computer system 700 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and a persistent database and/or a multi-tenant database implementation), which communicate with each other via a bus 730. Main memory 704 includes a broker 724 to implement the mechanisms described herein, such as the message queue the message processing engine 723 and to communicate with the data store via the query interface 725. Main memory 704 and its sub-elements are operable in conjunction with processing logic 726 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include a network interface card 708. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.).

The secondary memory 718 may include a non-transitory machine-readable storage medium or a non-transitory computer readable storage medium or a non-transitory machine-accessible storage medium 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system to execute within a host organization, wherein the system comprises:
    a processor and a memory;
    wherein the system executes instructions via the processor and memory which cause the system to perform the following operations:
    receiving messages at a message broker;
    enqueuing the received messages within a message queue of the message broker;
    establishing a push connection from the broker to a thread and pushing an initial message from the message queue to the thread and processing the initial message via the thread;
    establishing a pull connection from the thread to the broker and requesting one or more additional messages from the message queue, and bulk processing the one or more additional messages with the initial message from the broker;
    issuing a database query via a query interface by issuing the database query from the thread to a data store, wherein the database query specifies the initial message and the one or more additional messages as a set of messages and obtaining a lock for the set of messages; and
    handling, via a message processing engine, by processing the set of messages in bulk when the lock for the set of messages is obtained and re-enqueuing any of the set of messages for which the lock is not obtained.

2. The system of claim 1:
    wherein the lock for the set of messages is obtained responsive to the database query; and
    wherein the set of messages is processed by the message processing engine concurrently in bulk.

3. The system of claim 2, wherein subsequent to successful processing of the set of messages concurrently in bulk by the message processing engine the query interface deletes records corresponding to the set of messages from the data store and commits the delete.

4. The system of claim 1, wherein the data store comprises a relational database;
    wherein the relational database stores records corresponding to the messages received and enqueued by the broker.

5. The system of claim 4:
    wherein issuing the database query from the query interface to the data store further comprises issuing an update via the database query specifying the initial message and the one or more additional messages as the set of messages and obtaining the lock for the set of messages; and
    wherein the lock for the set of message is obtained responsive to the database query when a record exists in the relational database for each of the messages in the set and additionally when the record is not already subject to a lock.

6. The system of claim 1:
    wherein the query interface issues a second database query from the thread to the data store responsive to the lock for the set of messages failing to be obtained, wherein the second database query specifies records corresponding to each of the messages in the set via a SELECT statement within an SQL query; and
    wherein the data store returns a record set responsive to the SELECT statement listing all records in the data store corresponding to the messages in the set that presently exist within the data store regardless of whether or not the records are locked.

7. The system of claim 6, wherein the message processing engine further determines which records corresponding to the set of messages are non-existent in the data store as having been previously deleted based on a differential comparison between the messages in the set and the record set returned responsive to the SELECT statement.

8. The system of claim 1:
    wherein bulk processing the one or more additional messages with the initial message from the broker includes database transactions processed against a first database within the host organization, the first database storing customer data; and
    wherein the data store comprises a second database storing records corresponding to the messages received and enqueued by the broker.

9. The system of claim 8:
    wherein the first database within the host organization storing customer data comprises a multi-tenant database system of the host organization storing customer data on behalf of a plurality of separate and distinct customer organizations; and
    wherein the second database comprises a relational database operated within the host organization stores the records corresponding to the messages received and having been enqueued by the broker without being accessible to any of the plurality of separate and distinct customer organizations which utilize the multi-tenant database system.

10. The system of claim 9, wherein each of the plurality of separate and distinct customer organizations which utilize the multi-tenant database system is an entity selected from the group consisting of: a separate and distinct remote organization, an organizational group within the host organization, a business partner of the host organization, or a customer organization that subscribes to cloud computing services provided by the host organization.

11. The system of claim 1, wherein the system further comprises the message queue enqueuing the received messages at the direction of the broker.

12. The system of claim 1, wherein processing the initial message via the thread includes the initial message comprising comprises a flag indicating application of bulk processing of the initial message concurrently with other enqueued messages.

13. The system of claim 1, wherein processing the initial message via the thread includes the initial message comprising information specifying other enqueued messages are subject to bulk processing concurrently with the initial message, wherein the information comprises at least one of:
    a bulk processing flag;
    an enumerated set of additional message IDs to be processed concurrently with the initial message;

a message type for which additional messages having the same message type are to be processed in bulk concurrently with the initial message;

a range of message IDs to be processed concurrently with the initial message;

search criteria to locate one or more additional messages to be processed concurrently with the initial message; and a quantity or numerical quantity range of additional messages to be processed concurrently with the initial message.

14. The system of claim 1, wherein the message processing engine analyzes the initial message for a flag, count, search criteria, enumerated set, or message type and subsequently retrieves the one or more additional messages from the broker and bulk processing the subsequently retrieved one or more additional messages concurrently with the initial message.

15. The system of claim 1, further comprising determining, via the message processing engine the lock for the set of messages is not obtained;

issuing, via the query interface a second database query requesting a record set corresponding to the set of messages;

wherein re-enqueuing any of the set of messages for which the lock is not obtained comprises the message processing engine re-enqueuing any message of the set determined to exist within the data store but for which the lock cannot be obtained; and wherein the method further comprises discarding, via the message processing engine any message of the set determined to no longer exist as a record within the data store.

16. The system of claim 1:

wherein any message for which a lock is obtained pursuant to the first database query indicates a record corresponding to the message exists in the data store and is not actively undergoing processing by any thread;

wherein any message for which a lock is not obtained pursuant to the first database query and which is determined to exist within the data store pursuant to the second database query indicates a record corresponding to the message exists in the data store but is actively undergoing processing by another thread or processing of the message by another thread has terminated abnormally and will be handled by future processing after re-enqueuing of the corresponding message with the broker; and wherein any message for which a lock is not obtained pursuant to the first database query and which is determined to be non-existent exist within the data store pursuant to the second database query indicates processing of the message by another thread successfully processed and deleted the corresponding record from the data store and the message may be permissibly discarded as an erroneous duplicate message.

17. The system of claim 1:

wherein the thread constitutes one thread among a plurality of threads available for processing the received messages on behalf of the host organization and processing at least the one thread available for processing; and wherein each thread is one of a server in a pool of servers, a computing blade amongst a group of blades, a single computer node within a computing grid, a processing work thread executing via processor cores amongst a plurality of processing work threads, or one of a plurality of computing nodes amongst a distributed network of computing nodes.

18. A method executing within a system of a host organization, the system having a processor and a memory therein executing instructions within the system, wherein the method comprises:

receiving messages at a message broker;

enqueuing the received messages within a message queue of the message broker;

establishing a push connection from the broker to a thread and pushing an initial message from the message queue to the thread and processing the initial message via the thread;

establishing a pull connection from the thread to the broker and requesting one or more additional messages from the message queue, and bulk processing the one or more additional messages with the initial message from the broker;

issuing a database query via a query interface by issuing the database query from the thread to a data store, wherein the database query specifies the initial message and the one or more additional messages as a set of messages and obtaining a lock for the set of messages; and handling, via a message processing engine, by processing the set of messages in bulk when the lock for the set of messages is obtained and re-enqueuing any of the set of messages for which the lock is not obtained.

19. The method of claim 18, further comprising:

obtaining the lock for the set of messages responsive to the database query;

processing the set of messages concurrently in bulk; and determining processing of the set of messages was successful.

20. The method of claim 19, further comprising:

de-queuing the set of messages from the message queue of the message broker; and issuing a new database query to the data store to delete all records corresponding to the set of messages successfully processed and committing the delete.

21. The method of claim 18:

wherein the data store comprises a relational database storing records corresponding to the messages received and enqueued by the broker;

wherein the method further comprises obtaining the lock for the set of messages by issuing an update via the database query specifying the initial message and the one or more additional messages as the set of messages; and wherein the lock for the set of message is obtained responsive to the database query when a record exists in the relational database for each of the messages in the set and when the record is not already subject to a lock.

22. The method of claim 18, further comprising:

issuing a second database query to the data store responsive to the lock for the set of messages failing to be obtained, wherein the second database query specifies records corresponding to each of the messages in the set via a SELECT statement within an SQL query; and receiving a record set from the data store responsive to the SELECT statement listing all records in the data store corresponding to the messages in the set that presently exist within the data store regardless of whether or not the records are locked.

23. The method of claim 22, further comprising:
  determining which records corresponding to the set of messages are non-existent in the data store as having been previously deleted based on a differential comparison between the messages in the set and the record set returned responsive to the SELECT statement;
  wherein the initial message and the one or more additional messages for bulk processing with the initial message embody database transactions to be processed against a first database within the host organization, the first database storing customer data; and
  wherein the data store comprises a second database to store records corresponding to the messages received and enqueued by the broker.

24. Non-transitory computer readable storage media having instructions stored thereon that, when executed by a processor of a system, the instructions cause the system to perform operations comprising:
  receiving messages at a message broker;
  enqueuing the received messages within a message queue of the message broker;
  establishing a push connection from the broker to a thread and pushing an initial message from the message queue to the thread and processing the initial message via the thread;
  establishing a pull connection from the thread to the broker and requesting one or more additional messages from the message queue, and bulk processing the one or more additional messages with the initial message from the broker;
  issuing a database query via a query interface by issuing the database query from the thread to a data store, wherein the database query specifies the initial message and the one or more additional messages as a set of messages and obtaining a lock for the set of messages; and
  handling, via a message processing engine, by processing the set of messages in bulk when the lock for the set of messages is obtained and re-enqueuing any of the set of messages for which the lock is not obtained.

25. The non-transitory computer readable storage media of claim 24, further comprising:
  issuing a second database query to the data store responsive to the lock for the set of messages not being obtained, wherein the second database query specifies records corresponding to each of the messages in the set via a SELECT statement within an SQL query;
  receiving a record set from the data store responsive to the SELECT statement listing all records in the data store corresponding to the messages in the set that presently exist within the data store regardless of whether or not the records are locked;
  determining which records corresponding to the set of messages are non-existent in the data store as having been previously deleted based on a differential comparison between the messages in the set and the record set returned responsive to the SELECT statement;
  wherein the initial message and the one or more additional messages for bulk processing with the initial message embody database transactions to be processed against a first database within the host organization, the first database storing customer data; and
  wherein the data store comprises a second database to store records corresponding to the messages received and enqueued by the broker.

\* \* \* \* \*